United States Patent
Fu

(10) Patent No.: US 10,574,446 B2
(45) Date of Patent: Feb. 25, 2020

(54) METHOD AND SYSTEM FOR SECURE DATA STORAGE AND RETRIEVAL

(71) Applicant: Alibaba Group Holding Limited, George Town, Grand Cayman (KY)

(72) Inventor: Yingfang Fu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 209 days.

(21) Appl. No.: 15/717,729

(22) Filed: Sep. 27, 2017

(65) Prior Publication Data
US 2018/0109378 A1 Apr. 19, 2018

(30) Foreign Application Priority Data
Oct. 14, 2016 (CN) .......................... 2016 1 0900293

(51) Int. Cl.
*H04L 9/00* (2006.01)
*H04L 9/08* (2006.01)
*H04L 9/32* (2006.01)
*H04L 29/06* (2006.01)

(52) U.S. Cl.
CPC .......... *H04L 9/0852* (2013.01); *H04L 9/0897* (2013.01); *H04L 9/3242* (2013.01); *H04L 63/0853* (2013.01); *H04L 63/0869* (2013.01); *H04L 9/3234* (2013.01)

(58) Field of Classification Search
CPC ... H04L 9/0852; H04L 9/0897; H04L 9/3242; H04L 9/3234; H04L 63/0853; H04L 63/0869
See application file for complete search history.

(56) References Cited

U.S. PATENT DOCUMENTS

| | | | |
|---|---|---|---|
| 5,307,410 | A | 4/1994 | Bennett |
| 5,675,648 | A | 10/1997 | Townsend |
| 6,505,247 | B1 | 1/2003 | Steger |
| 9,077,577 | B1 | 7/2015 | Ashrafi |
| 9,130,742 | B2 | 9/2015 | Yao |
| 9,294,267 | B2 | 3/2016 | Kamath |
| 9,323,901 | B1 | 4/2016 | Nair |

(Continued)

FOREIGN PATENT DOCUMENTS

| | | |
|---|---|---|
| EP | 0962070 | 12/1999 |
| WO | 2012098543 | 7/2012 |

(Continued)

OTHER PUBLICATIONS

Mark Hillery et al. "Quantum Secret Sharing", American Physical Society 1999.

(Continued)

*Primary Examiner* — Beemnet W Dada
(74) *Attorney, Agent, or Firm* — Shun Yao; Park, Vaughan, Fleming & Dowler LLP

(57) ABSTRACT

One embodiment described herein provides a system and method for secure data storage. During operation, a client device selects a quantum data key from a plurality of quantum data keys shared between the client device and a storage server, encrypts to-be-stored data using the selected quantum data key, and transmits a data-storage request to the storage server. The data-storage request comprises a key-identifier of the selected quantum data key and the encrypted data.

24 Claims, 10 Drawing Sheets

(56) References Cited

U.S. PATENT DOCUMENTS

| | | |
|---|---|---|
| 9,698,979 B2 * | 7/2017 | Armstrong ............ H04L 9/0855 |
| 9,887,976 B2 | 2/2018 | Hughes |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2007/0016794 A1 | 1/2007 | Harrison |
| 2007/0076889 A1 | 4/2007 | DeRobertis |
| 2007/0147292 A1 | 6/2007 | Van Ewijk |
| 2007/0192598 A1 | 8/2007 | Troxel |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2008/0222734 A1 | 9/2008 | Redlich |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0204812 A1 | 8/2009 | Baker |
| 2009/0271634 A1 | 10/2009 | Boult |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2010/0299526 A1 | 11/2010 | Wiseman |
| 2011/0069972 A1 | 3/2011 | Wiseman |
| 2011/0099367 A1 | 4/2011 | Thom |
| 2011/0126011 A1 | 5/2011 | Choi |
| 2011/0167503 A1 | 7/2011 | Horal |
| 2011/0209202 A1 | 8/2011 | Otranen |
| 2011/0213979 A1 | 9/2011 | Wiseman |
| 2011/0231615 A1 | 9/2011 | Ober |
| 2012/0045002 A1 | 2/2012 | Zivkovic |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0208894 A1 | 8/2013 | Bovino |
| 2013/0227286 A1 | 8/2013 | Brisson |
| 2013/0246641 A1 | 9/2013 | Vimpari |
| 2013/0251145 A1 | 9/2013 | Lowans |
| 2013/0315395 A1 | 11/2013 | Jacobs |
| 2014/0068765 A1 | 3/2014 | Choi |
| 2014/0141725 A1 | 5/2014 | Jesme |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0095987 A1 | 4/2015 | Potash |
| 2015/0181308 A1 | 6/2015 | Ducharme |
| 2015/0207926 A1 | 7/2015 | Brown |
| 2015/0222619 A1 | 8/2015 | Hughes |
| 2015/0236852 A1 | 8/2015 | Tanizawa |
| 2015/0270963 A1 | 9/2015 | Tanizawa |
| 2015/0271147 A1 | 9/2015 | Tanizawa |
| 2015/0288517 A1 | 10/2015 | Evans |
| 2015/0288542 A1 | 10/2015 | Ashrafi |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0021068 A1 | 1/2016 | Jueneman |
| 2016/0080708 A1 | 3/2016 | Urata |
| 2016/0087946 A1 * | 3/2016 | Yang ...................... G06F 21/62 |
| | | 713/171 |
| 2016/0105439 A1 | 4/2016 | Hunt |
| 2016/0127127 A1 | 5/2016 | Zhao |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0337329 A1 | 11/2016 | Sood |
| 2016/0359839 A1 | 12/2016 | Natividad |
| 2017/0034167 A1 | 2/2017 | Figueira |
| 2017/0230173 A1 | 8/2017 | Choi |
| 2017/0302448 A1 | 10/2017 | Luk |
| 2017/0324730 A1 | 11/2017 | Otranen |
| 2018/0048466 A1 | 2/2018 | Chen |
| 2018/0063709 A1 * | 3/2018 | Morrison ............... H04W 12/06 |

FOREIGN PATENT DOCUMENTS

| | | |
|---|---|---|
| WO | 2013026086 | 2/2013 |
| WO | 2016070141 | 5/2016 |

OTHER PUBLICATIONS

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

METHOD AND SYSTEM FOR SECURE DATA STORAGE AND RETRIEVAL

RELATED APPLICATION

Under 35 U.S.C. § 119, this application claims the benefit and right of priority of Chinese Patent Application No. 201610900293.8, filed on 14 Oct. 2016.

This application is related to U.S. patent application Ser. No. 15/716,965, entitled "METHOD AND SYSTEM FOR DATA SECURITY BASED ON QUANTUM COMMUNICATION AND TRUSTED COMPUTING," by inventor Yingfang Fu, filed 27 Sep. 2017; and U.S. patent application Ser. No. 15/717,553, entitled "METHOD AND SYSTEM FOR QUANTUM KEY DISTRIBUTION BASED ON TRUSTED COMPUTING," by inventor Yingfang Fu, filed 27 Sep. 2017, the disclosures of which are incorporated herein by reference in their entirety for all purposes.

BACKGROUND

Field

This disclosure is generally related to data security. More specifically, this disclosure is related to a system and method that provide secure storage and retrieval of custom data in a cloud computing environment.

Related Art

In recent years, cloud computing has become a highly demanded service or utility due to the advantages of high computing power, cheap cost of services, high performance, scalability, and accessibility, as well as availability. In cloud computing, different services, including servers, storage, and applications, can be delivered by the service provider to a customer's computers and devices via the Internet. More specifically, cloud storage services allow individual or enterprise users to store their digital data in data centers that are owned and managed by a hosting company or a cloud storage provider. The cloud storage providers are responsible for protecting and maintaining the physical environment (e.g., data centers). Cloud storage can be a cost-saving solution for enterprise users because they no longer need to purchase hardware, and can only pay for the storage that is actually used. Cloud storage can provide data backup for users in case of an emergency. Moreover, cloud storage users can have immediate access to a broad range of resources and applications hosted in the infrastructure of other organizations, allowing data collaborations among users in different physical domains. However, security is a big concern for cloud storage users. Because sensitive data may now be stored off-premise, many conventional security measures for protecting data held on-premise no longer apply. More specifically, distributing the data to more storage locations increases the risk of unauthorized physical access to the data, and sharing storage and networks with other customers also increases the risk of the data being accessed by other customers. Conventional data security approaches cannot meet the unique security requirements of cloud storage.

SUMMARY

One embodiment described herein provides a system and method for secure data storage. During operation, a client device selects a quantum data key from a plurality of quantum data keys shared between the client device and a storage server, encrypts to-be-stored data using the selected quantum data key, and transmits a data-storage request to the storage server. The data-storage request comprises a key-identifier of the selected quantum data key and the encrypted data.

In a variation on this embodiment, the client device and the storage server perform mutual authentication, which comprises exchanging trusted measurement reports between the client device and the storage server.

In a variation on this embodiment, the data-storage request further comprises a hash of the to-be-stored data, thereby facilitating the storage server to validate the encrypted data included in the data-storage request.

In a further variation, the client device receives, from the storage server, a data-storage response, which includes a predetermined variation of the key-identifier. In response to validating the predetermined variation of the key-identifier, the client device saves the hash of the to-be-stored data. The saved hash of the to-be-stored data is indexed using the key identifier.

In a variation on this embodiment, the key-identifier included in the data-storage request is encrypted.

In a variation on this embodiment, the quantum data keys are encrypted using a storage root key provided by a trusted computing module or a storage key derived from the storage root key, and selecting the quantum data key further comprises performing a decryption operation.

In a variation on this embodiment, the client device transmits a data-retrieval request, which comprises a second key-identifier, to the storage server; and receives, from the storage server, a second piece of data encrypted using a second quantum data key corresponding to the second key-identifier.

In a further variation, the client device decrypts the received second piece of data, computes a hash of the second piece of data, and determines validity of the received second piece of data based on the computed hash and a hash stored on the client device.

In a further variation, the data-retrieval request further comprises a computation indicator configured to indicate to the storage server whether computation on the second piece of data is needed.

One embodiment described herein provides a system and method for secure data storage. During operation, a storage server receives a data-storage request from a client. The data-storage request comprises a key-identifier and encrypted data; the key-identifier is configured to identify a quantum data key from a plurality of quantum data keys shared between the client and the storage server; and the encrypted data is encrypted using the identified quantum data key. The storage server stores the encrypted data and indexing the stored data using the key-identifier.

In a variation on this embodiment, the storage server receives a data-retrieval request, which comprises a second key-identifier, from the client; performs a table lookup to obtain a second piece of data encrypted using a second quantum data key corresponding to the second key-identifier; and transmits a data-retrieval response, which comprises the encrypted second piece of data, to the client.

In a further variation, the data-retrieval request further comprises a computation indicator configured to indicate whether computation on the second piece of data is needed. In response to the computation indicator indicating that computation on the second piece of data is needed, the storage server performs computation based on a computation description included in the data-retrieval request to obtain computation result, encrypts the computation result using the second quantum data key, and replaces the encrypted second piece of data included in the data-retrieval response with the encrypted computation result.

In a further variation, the storage server calculates a hash of the computation result and includes the hash in the data-retrieval response, thereby facilitating the client to validate the data-retrieval response.

BRIEF DESCRIPTION OF THE FIGURES

In the figures, like reference numerals refer to the same figure elements.

DETAILED DESCRIPTION

Figure 1:
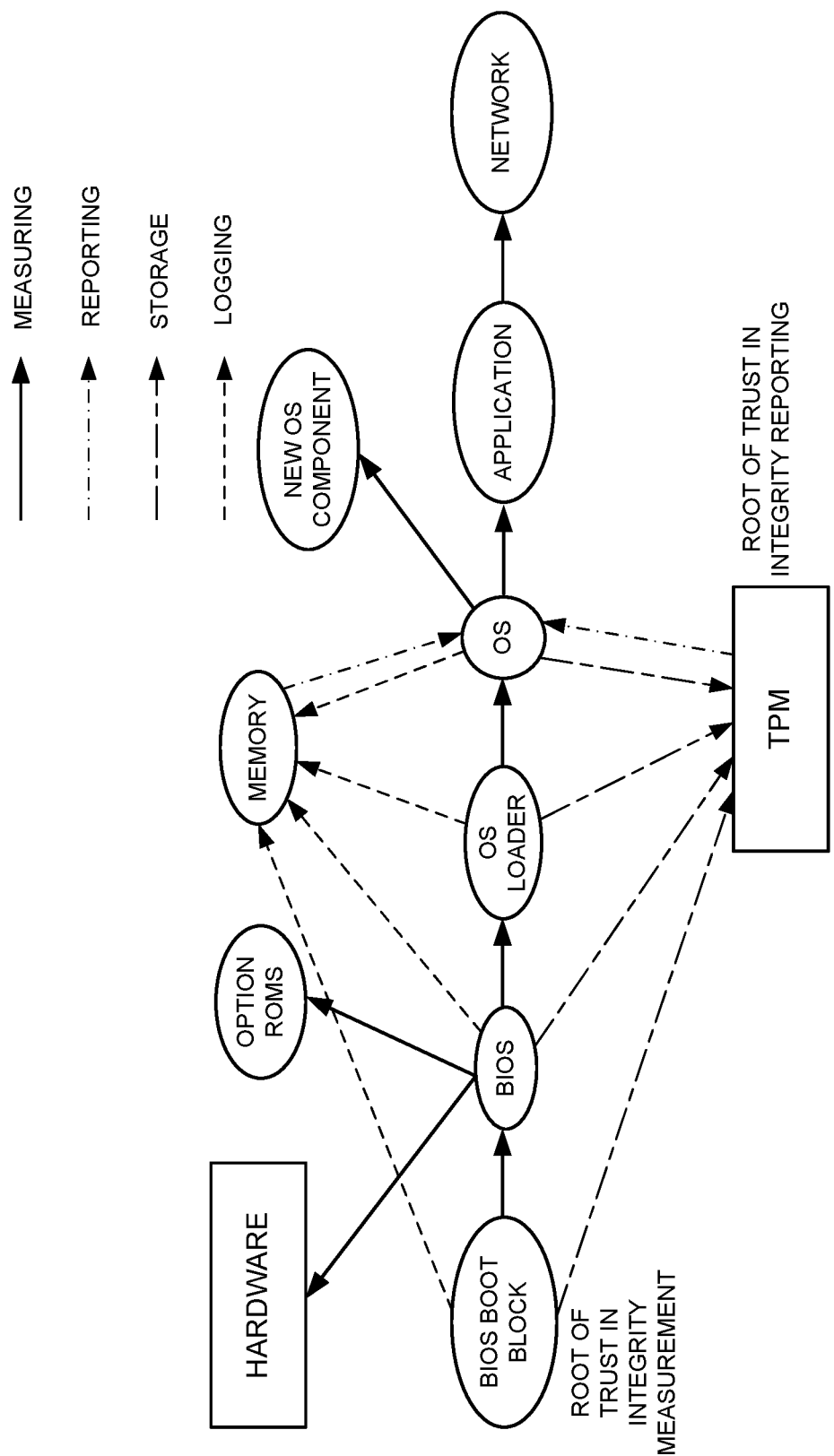
FIG. 1 illustrates the chain of trust in a PC as defined by the Trusted Computing Group.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system are presented for providing secure data storage and data retrieval in a cloud computing setting. To facilitate secure data storage, a trusted client device and a trusted storage server can first negotiate a set of quantum data keys and securely store the quantum data keys in their corresponding TPM or TPM protected storage. Before storing data over the cloud, trusted-computing-based mutual authentication can be performed between the client and the trusted storage server. To store data, the trusted client device can select a quantum data key from the set of negotiated keys and encrypt the to-be-stored data using the selected quantum data key. The trusted client can then send an identifier of the selected quantum data key and the encrypted data to the trusted storage server. The trusted client can also send a hash of the data to the server. The server can obtain the corresponding key, decrypt the data, and calculate the hash in order to validate the received data. After validation, the server can store the encrypted data. To retrieve data from the cloud, the trusted client can send the key-identifier to the storage server, which can perform a table lookup based on the key-identifier to obtain the stored data. The server can then send the stored data or computation result on the stored data back to the trusted client. Similarly, a hash of the data can be used to validate the data.

In this disclosure, a storage device can be referred to as a trusted storage (e.g., a trusted server or a trusted client) if the storage is equipped with modules that can enable trusted computing. In addition, it is assumed that other components in the cloud computing environment, including cloud server computers, cloud client computers, cloud control nodes, etc., are also trusted-computing enabled.

Trusted Computing

Trusted Computing is an emerging technology developed by the Trusted Computing Group (TCG) towards building trustworthy computer platforms. In trusted computing, the computer will consistently behave in expected ways, and those behaviors will be enforced by computer hardware and software. Enforcing this behavior is achieved by loading the hardware with a unique encryption key inaccessible to the rest of the system. According to the TCG, "[[a]] trusted component, operation, or process is one whose behavior is predictable under almost any operating condition and which is highly resistant to subversion by application software, viruses, and a given level of physical interference."

The core of the trusted computing is the root of trust and the chain of trust. In trusted computing, the root of trust can be factory-installed hardware or firmware, such as the Trusted Platform Module (TPM). A TPM can be implemented as dedicated, cost-effective crypto-chips. A TPM can be physically connected to the computation platform and coupled to the CPU (central processing unit) via external buses. For example, the TPM on a personal computer (PC) can be mounted onto the main board of the PC and connected via a Low Pin Count (LPC) bus. In addition to storing the information for authenticating the platform, a TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

The chain of trust is the iterative means to extend the boundary from the root of trust. The trustworthiness of a currently running component is based on the trustworthiness of a previously running component. Starting from the root of trust (also known as the trust anchor), if each time the computational environment of the platform changes (e.g., the running of certain codes), the trust can be maintained, thus establishing a reliable chain of trust, the platform can be viewed as trustworthy by local and remote entities.

Trusted computing technologies can include trusted measurement, trusted reporting, trusted storage, and trusted networking. FIG. 1 illustrates the chain of trust in a PC as defined by the Trusted Computing Group. More specifically, FIG. 1 shows the chain of trust for measurement, reporting, storage, and logging.

In addition to TPMs, Trusted Platform Control Modules (TPCMs) have also been developed. TPM was a subordinate device and the root of trusted measurement was put into BIOS (as shown in FIG. 1), which faces the threat of being tampered with. TPCM incorporates into the module the root of trusted measurement, thus protecting the root and original point of measurement and modifying the boot and measurement sequence. Accordingly, a chain of trust can be established using the TPCM chip as the trust anchor, thus allowing the TPCM chip to control the boot, I/O, and provisioning of the system.

During the operation of the computing platform, the TPCM needs to ensure the integrity of the next level executable codes before the system transfers control to the next level executable code. The control of the system continues to be transferred to subsequent levels of executable code, thus establishing the chain of trust. More specifically, the TPCM or the TPM can start the boot process from a trusted condition and extend this trust until the operating system has fully booted and applications are running.

Principles of Quantum Key Distribution

According to quantum physics, some physical quantities of the microscopic world cannot continuously change but take on certain discrete values, and the difference between two adjacent discrete values is referred to as a "quantum," e.g., a photon is a single quantum of light.

In traditional communication where laws of classical mechanics apply, digital information can be represented as bits, wherein each bit can have two states: e.g., "0s" and "1s," or "high" and "low" voltages. In contrast, in quantum communication where laws of classical mechanics do not apply, information is typically represented as quantum bits (qubits), which are units of quantum information. Each qubit can have two basic states: |0> or ↔ and |1> or ↕. In this case, the two quantum states |0> and |1> form a quantum state basis, which can be expressed as {|0>, |1>}.

Moreover, a quantum quantity can also take on a mixed state obtained by the superposition of the two basic states with coefficients α, β, respectively. For example, if quantum basis {|0>, |1>} is used, then a mixed state can be expressed as:

$$|\varphi\rangle = \alpha|0\rangle + \beta|1\rangle.$$

For example, mixed quantum state basis {|+⟩, |−⟩} can be generated by superpositioning the basic quantum states |0⟩/↔ and |1⟩/↕ using the following formulae:

$$|+\rangle = \frac{\leftrightarrow + \updownarrow}{\sqrt{2}}, \quad |-\rangle = \frac{\leftrightarrow - \updownarrow}{\sqrt{2}}.$$

Note that in the above two bases of quantum state representations, states |0> and |1> are orthogonal to each other, while states |+> and |−> are orthogonal to each other.

In quantum mechanics, a given mechanical quantity can be measured using the above-described quantum states, which are also referred to as "measurement basis." For example, each mechanical quantity can be expressed by a Hermitian operator (or Hermitian matrix). When measuring such a mechanical quantity, the measurement results correspond to the eigenvalues (or the "characteristic values") of the Hermitian operator for this mechanical quantity. After the measurement, the quantum state being measured collapses to the eigenstates (or the "eigenvectors") corresponding to the obtained eigenvalues. Table 1 illustrates two exemplary mechanical quantity measurement schemes based on using two different sets of quantum states in accordance with one embodiment described herein.

TABLE 1

Mechanical Quantity Measurement Using a Set of Quantum States

| Mechanical Quantity | | |
|---|---|---|
| $Z = \begin{pmatrix} 1 & 0 \\ 0 & -1 \end{pmatrix}$ | Eigenvalues: 1, −1<br>Eigenstates: \|0⟩, \|1⟩ | Referred to as measuring using set {\|0⟩, \|1⟩} |
| $Z = \begin{pmatrix} 0 & 1 \\ 1 & 0 \end{pmatrix}$ | Eigenvalues: 1, 1<br>Eigenstates: \|+⟩, \|−⟩ | Referred to as measuring using set {\|+⟩, \|−⟩} |

For example, when using quantum state basis {|0⟩, |1⟩} to measure quantum state |φ⟩=α|0⟩+β|1⟩, wherein $|\alpha|^2 + |\beta|^2 = 1$, we will obtain a measurement value of 1 with a probability of $|\alpha|^2$, wherein after the measurement the quantum state collapses to |0⟩; and we will obtain a measurement value of −1 with a probability of $|\beta|^2$, wherein after the measurement the quantum state collapses to |1⟩.

As another example, when using quantum state basis {|0⟩, |1⟩} to measure quantum state |0⟩, we will obtain state |0⟩ with probability 1. Similarly, when using quantum state basis {|+⟩, |−⟩} to measure quantum state |+⟩, we will obtain state |+⟩ with probability 1.

Furthermore, when using quantum state basis {|0⟩, |1⟩} to measure quantum state |+⟩, we will randomly obtain either state |0⟩ or state |1⟩. Similarly, when using quantum state basis {|+⟩, |−⟩} to measure state |0⟩, we will randomly obtain either state |+⟩ or state |−⟩.

Bennett-Brassard-84 (BB84) is a popular quantum key distribution protocol. BB84 uses the polarization states of single photons to transmit information. The usual polarization state pairs used are either the rectilinear basis of vertical (0°) and horizontal (90°), the diagonal basis of 45° and 135° or the circular basis of left- and right-handedness. Any two of these bases are conjugate to each other, so any two can be used in the protocol. In the BB84 scheme, sender Alice wishes to send a private key (e.g., a random string) to receiver Bob. Alice starts by generating a random bit and randomly selects from two quantum bases a quantum basis to encode the binary bit. Alice then transmits a single photon in the state specified to Bob, using the quantum channel. This process is then repeated from the random bit stage, with Alice recording the state, basis and time of each photon sent. Upon receiving a photon, Bob performs measurements using randomly selected basis. Bob does this for each photon he receives, recording the time, measurement basis used, and measurement result. After Bob has measured all the photons, he communicates with Alice over the public classical channel. Alice broadcasts the basis each photon was sent in, and Bob the basis each was measured in. They both discard photon measurements (bits) where Bob used a different basis, which is half on average, leaving half the bits as a shared key.

To check for the presence of an eavesdropper Eve, Alice and Bob can compare a predetermined subset of their remaining bit strings. If a third party has gained any information about the photons' polarization, this introduces errors into Bob's measurements. Other environmental conditions can cause errors in a similar fashion. If the bit error rate is less than a predetermined threshold, error-correction techniques can be used to correct errors, and privacy amplification can be used to reduce Eve's knowledge of the key to an arbitrarily small amount at the cost of reducing the length of the key. If the bit error rate is greater than a predetermined threshold, they abort the key and try again, possibly with a different quantum channel, as the security of the key cannot be guaranteed.

Note that, in addition to the presence of an eavesdropper, other environmental factors (e.g., quality of the quantum channel or transmitting/receiving equipment) may also introduce errors. For example, a channel with high loss may result in increased error rate. Without an accurate estimation of the environmentally induced error rate, a QKD scheme may not be able to produce a shared quantum string, because they are always being discarded. Certain existing system may require that the error rate to be less than 7% in order to produce a shared quantum string.

From the shared quantum string produced via QKD, Alice and Bob can further negotiate one or more quantum data keys, each quantum data key can include a subset of bits selected from the set of bits in the shared quantum string. Note that the quantum data keys are used as encryption keys in actual communications between Alice and Bob.

Secure Cloud Storage Architecture

Figure 2:
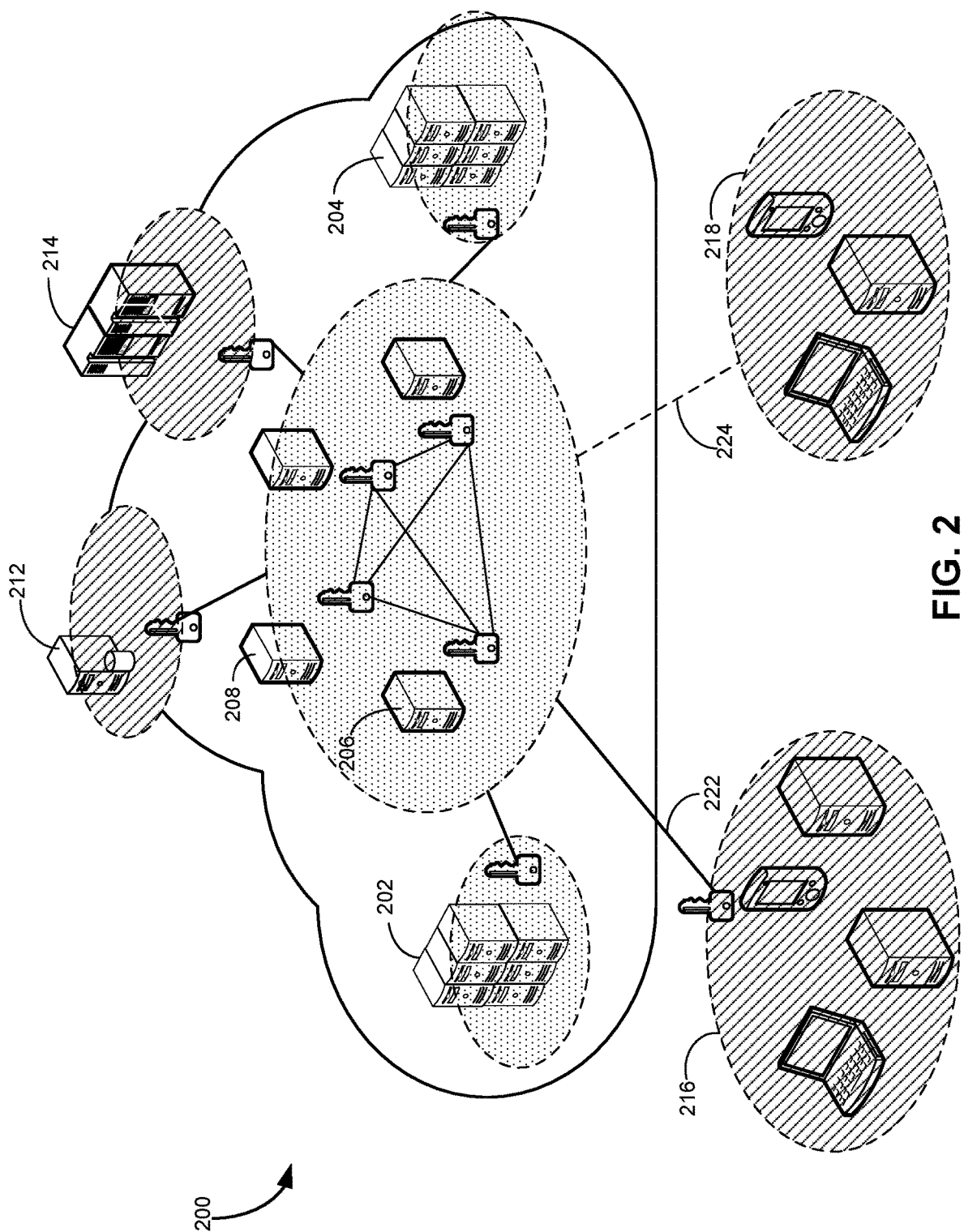
FIG. 2 illustrates the architecture of an exemplary secure cloud computing system based on quantum key distribution and trusted computing, according to one embodiment.

FIG. 2 illustrates the architecture of an exemplary secure cloud computing system based on quantum key distribution and trusted computing, according to one embodiment. A secure cloud computing system 200 can include a number of participating entities, such as the cloud provider and the cloud users. If the trusted certificate of the cloud is issued by a third party certificate authority (CA), the CA will also be part of secure cloud computing system 200. A CA is not included in the example shown in FIG. 2.

The cloud provider is responsible for providing the cloud control platform and the various cloud infrastructures, including both hardware and software components. In the example shown in FIG. 2, the entire cloud computing system can be divided into two realms, the one controlled by the cloud provider (shown as the shaded area) and the one controlled by the cloud users (shown as the hatched area).

In some embodiments, trusted computing is implemented in both the cloud provider realm and the user realm. For example, equipment provided by the cloud provider, which can include servers (e.g., clusters of servers 202 and 204) and cloud control nodes (e.g., nodes 206 and 208), can be equipped with modules that enforce trusted computing, such as TPMs. These TPMs can be implemented as hardware, firmware, and software modules. Moreover, user-controlled equipment, such as client machines, storage servers (e.g., database server 212), and peripheral storage devices (e.g., storage 214) can also be equipped with TPMs.

In addition to trusted computing, QKD technologies can also be implemented in both the cloud provider realm and the user realm. More specifically, quantum key exchange can be enabled among the cloud nodes, as shown by the key logos. On the other hand, two types of user device or client device may exist: one group of user devices is equipped with QKD modules (e.g., group 216), whereas the other group of user devices (e.g., group 218) does not have the quantum key exchange capability. In the example shown in FIG. 2, communication channels that also include a quantum channel to enable QKD are shown in solid lines (e.g., communication channel 222), whereas communication channels that do not include a quantum channel are shown in dashed lines (e.g., communication channel 224). More specifically, on the QKD-enabled communication channels, communication partners can negotiate encryption keys (also referred to as quantum data keys) using the quantum channel and then use the negotiated keys for secure communication. For example, a client device within group 216 can communicate with the cloud servers using the quantum-enhanced secure channel. Similarly, nodes within the cloud (e.g., the cloud control nodes and the cloud servers) can also communicate with each other using negotiated quantum data keys. On the other hand, users within user group 218 can only communicate with the cloud servers using keys negotiated via conventional technologies. Details regarding the process of obtaining the quantum data keys can be found in co-pending U.S. patent application Ser. No. 15/717,553, entitled "METHOD AND SYSTEM FOR QUANTUM KEY DISTRIBUTION BASED ON TRUSTED COMPUTING," by inventor Yingfang Fu, filed 27 Sep. 2017, the disclosure of which is incorporated herein by reference in its entirety.

Figure 3:
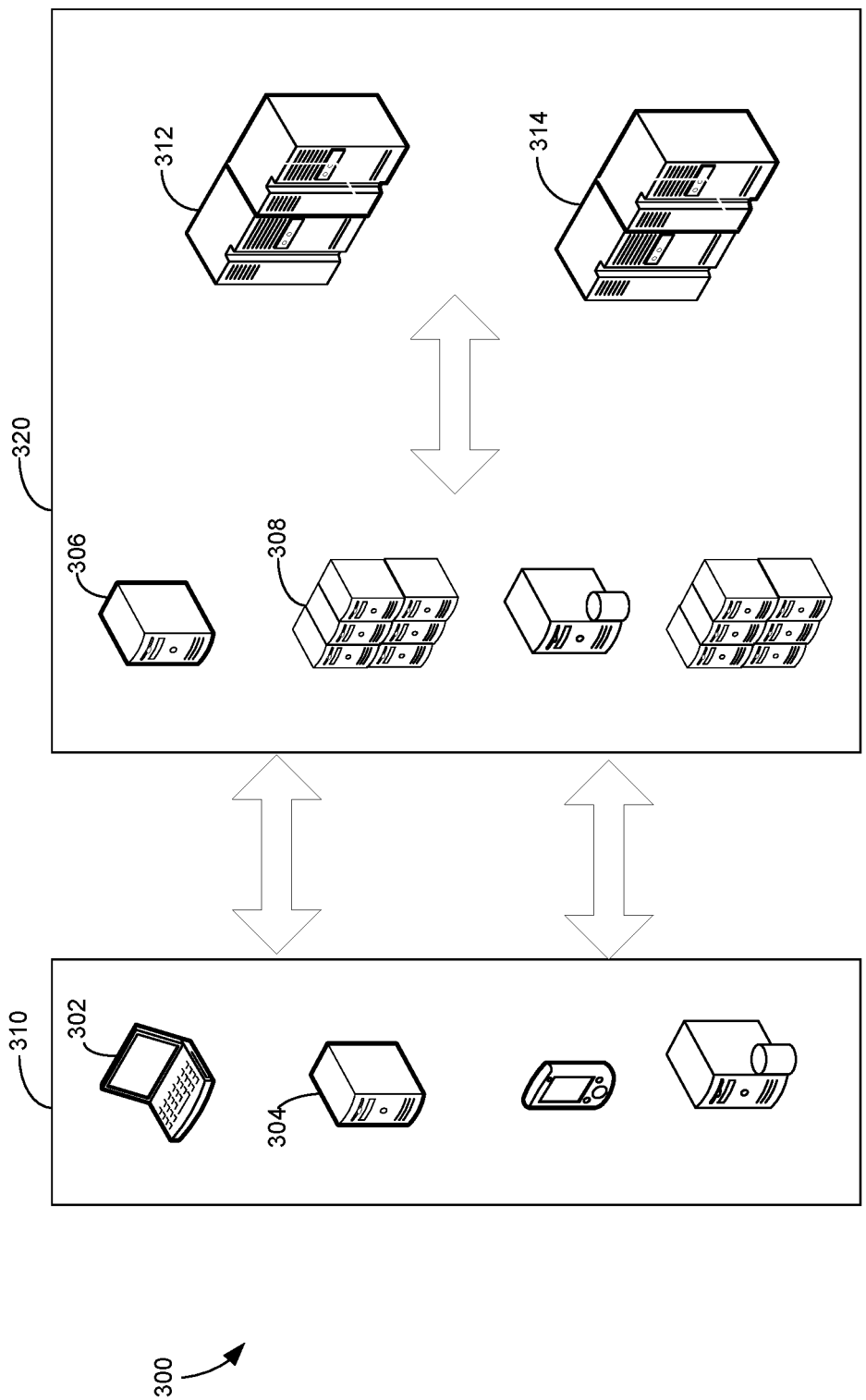
FIG. 3 presents a schematic of an exemplary secure cloud storage system, according to one embodiment.

FIG. 3 illustrates a schematic of an exemplary secure cloud storage system, according to one embodiment. Similar to the system shown in FIG. 2, a secure storage system 300 can include a cloud user realm 310 and a cloud provider realm 320. Cloud user realm 310 can include a number of client devices (e.g., client devices 302 and 304). Cloud provider realm 320 can include servers (or server clusters) (e.g., server 306 and server cluster 308) and peripheral storage devices (e.g., storage devices 312 and 314).

In some embodiments, to enable trusted computing, both client equipment and server equipment can be trusted-computing enabled. In other words, they are equipped with modules that enforce trusted computing rules, such as TPM or TPCM. For example, client devices 302 and 304 can each include a TPM, and peripheral storage devices 312 and 314 can also include TPMs. There are two different types of peripheral storage devices, some with computational capabilities and some without.

One approach to ensure user data security in the cloud relies on data encryption at the front end or the client side. Typically, a symmetric key block cipher, such as AES (Advanced Encryption Standard) can be used, and encrypted data is placed on the untrusted server. A query is executed by first rewriting it locally (on the trusted client), and issuing a rewritten query to the server. The (encrypted) results are sent back to the client, which decrypts the results to get the final answer.

A cloud user may store his data in the hard drives of the cloud server or server clusters (e.g., cloud server 306 or server cluster 308). In such a scenario, the cloud server may provide dedicated CPU space for data encryption/decryption computations. The encryption keys can also be stored in the hard drives of the server. If the user data is stored in a peripheral storage device that has computational capabilities (e.g., peripheral storage device 312), the peripheral storage device not only can provide storage for both the encrypted user data and the encryption key but also can perform data encryption/decryption computations. On the other hand, if the user data is stored in peripheral storage devices that do not have computational capabilities, the host of the peripheral storage device will be responsible for providing dedicated CPU space for data encryption/decryption computations. Note that storage of data and encryption keys that belong to different users should be separated logically or physically.

In some embodiments, the cloud can include a trusted authorization center that is responsible for issuing a trusted certificate and a corresponding private key to entities (or pieces of equipment) coupled to the cloud, including the cloud servers (e.g., server clusters 202 and 204 shown in FIG. 2), client machines, and storage devices (e.g., storage 214 shown in FIG. 2). In other words, the trusted authorization center functions as the CA for the cloud. The trusted authorization center can receive a trusted certificate and a corresponding private key from a third-party CA or it can generate the trusted certificate and private key using a TPM module associated with the trusted authorization center. To distinguish from other private keys issued to other entities or equipment in the cloud, the trusted certificate and private key of the trusted authorization center can be referred to as the system certificate and system private key, respectively. On the other hand, a private key issued by the trusted authorization center to a piece of equipment can be referred to as the equipment private key.

In some embodiments, the trusted authorization center can respond to an authorization request (or initialization request) from an entity, and issue a trusted certificate and a private key to the requesting entity. The trusted certificate and private key can be generated based on the system private key and information provided by the requesting entity or piece of equipment (e.g., the requesting entity's identity as well as its platform information). If the trusted authorization center is a distributed system that includes multiple control nodes, each control node may generate a subkey that can be sent to the requesting entity. The requesting entity can then generate an entity-specific private key based on a set of subkeys received from a subset of control nodes within the trusted authorization center. Note that, for a trusted-computing-enabled entity, the platform information can include a unique identifier and platform configuration register (PCR) values associated with a module (e.g., a TPM module or a TPCM module) that enforces trusted computing on the entity.

In some embodiments, to enable secure communication, any two entities can negotiate between themselves a set of quantum data keys using a trusted-computing-based quantum key negotiation process. The security of the negotiated keys can be ensured by both the QKD process and the trusted-computing modules. It can be assumed that the entities can each maintain a quantum data key pool that includes negotiated quantum data keys.

Detailed descriptions regarding the issuance of the a trusted certificate and equipment private key to an entity, and the negotiation of quantum data keys between two entities can be found in co-pending U.S. patent application Ser. No. 15/717,553, entitled "METHOD AND SYSTEM FOR QUANTUM KEY DISTRIBUTION BASED ON TRUSTED COMPUTING," by inventor Yingfang Fu, filed 27 Sep. 2017, the disclosure of which is incorporated herein by reference in its entirety.

Secure Data Storage Operation

In some embodiments, the negotiated quantum data keys are stored in encrypted form. For example, an entity can encrypt the negotiated quantum data keys using the storage root key (SRK) provided by its TPM or a storage key (SK) derived from the SRK. The negotiated data keys and their corresponding key-identifiers can be stored in the TPM or a data storage location external to the TPM. Because the SRK never leaves the TPM and the SK may remain in the TPM or only leaves the TPM after being encrypted, the security of the SRK and the SK can be sufficiently guaranteed. Hence, the encrypted quantum data keys can be considered secure or tamper-free.

Table 2 shows the encrypted quantum data keys and their corresponding key-identifiers maintained by a client machine, according to one embodiment.

TABLE 2

| Quantum Data Keys for Client | |
|---|---|
| KEY-IDENTIFIER | ENCRYPTED QUANTUM DATA KEY |
| 0 | $ENC_{sk\_c}(Q\_key\_0)$ |
| 1 | $ENC_{sk\_c}(Q\_key\_1)$ |
| 2 | $ENC_{sk\_c}(Q\_key\_2)$ |
| ... | ... |
| j | $ENC_{sk\_c}(Q\_key\_j)$ |
| ... | ... |
| m | $ENC_{sk\_c}(Q\_key\_m)$ |

Table 3 shows the encrypted quantum data keys and their corresponding key-identifiers maintained by a storage server that provides storage service to the client, according to one embodiment.

TABLE 3

| Quantum Data Keys for Storage Server | |
|---|---|
| KEY-IDENTIFIER | ENCRYPTED QUANTUM DATA KEY |
| 0 | $ENC_{sk\_s}(Q\_key\_0)$ |
| 1 | $ENC_{sk\_s}(Q\_key\_1)$ |
| 2 | $ENC_{sk\_s}(Q\_key\_2)$ |
| ... | ... |
| j | $ENC_{sk\_s}(Q\_key\_j)$ |
| ... | ... |
| m | $ENC_{sk\_s}(Q\_key\_m)$ |

As shown in Tables 2 and 3, the client machine and the storage server share m+1 quantum data keys. In this example, the key-identifier used by the client machine and the storage server for identifying a particular quantum data key is the same. More specifically, the client machine and the storage server both use a sequential numbering to identify the quantum data keys. In practice, the client machine and the storage server may choose to use different methods to identify the quantum data keys. The scope of this disclosure is not limited by the format of the key-identifiers as long as there is a one-to-one correspondence between the key identifiers and the quantum data keys, and between the key-identifiers used by the client and the key-identifiers used by the storage server.

To ensure security of the quantum data keys, the client machine can encrypt the quantum data keys using a storage key, denoted sk_c, derived from the SRK. Similarly, the storage server can encrypt the quantum data keys using its storage key, denoted sk_s.

To securely store data into the storage server or a peripheral storage device hosted by the storage server, the client machine needs to negotiate with the storage server an encryption key that can be used to encrypt the to-be-stored data. For strong security, one can choose the one-time key scheme where a particular quantum data key can only be used once. However, this requires a large number of keys, more frequent key-negotiation, and a relatively large key-storage space. On the other hand, the less secure many-time key scheme allows the same encryption to be repeatedly used, thus reducing the need for frequent key negotiation and the large key-storage space. In some embodiments, the one-time key scheme is used for secure data storage.

Because the client machine and the storage server have previously establish the shared quantum data keys, which can be tamper free, the client machine and storage server can select from the shared quantum data keys one or more keys for encrypting the to-be-stored data. In addition, to validate the integrity of the trusted-computing platform during data storage, the client machine and the storage server can exchange trusted measurement reports provided by their TPMs. Subsequent to performing proper identity authentication and platform integrity validation, the client machine can transmit the encrypted data to the storage server for storage.

Figure 4:
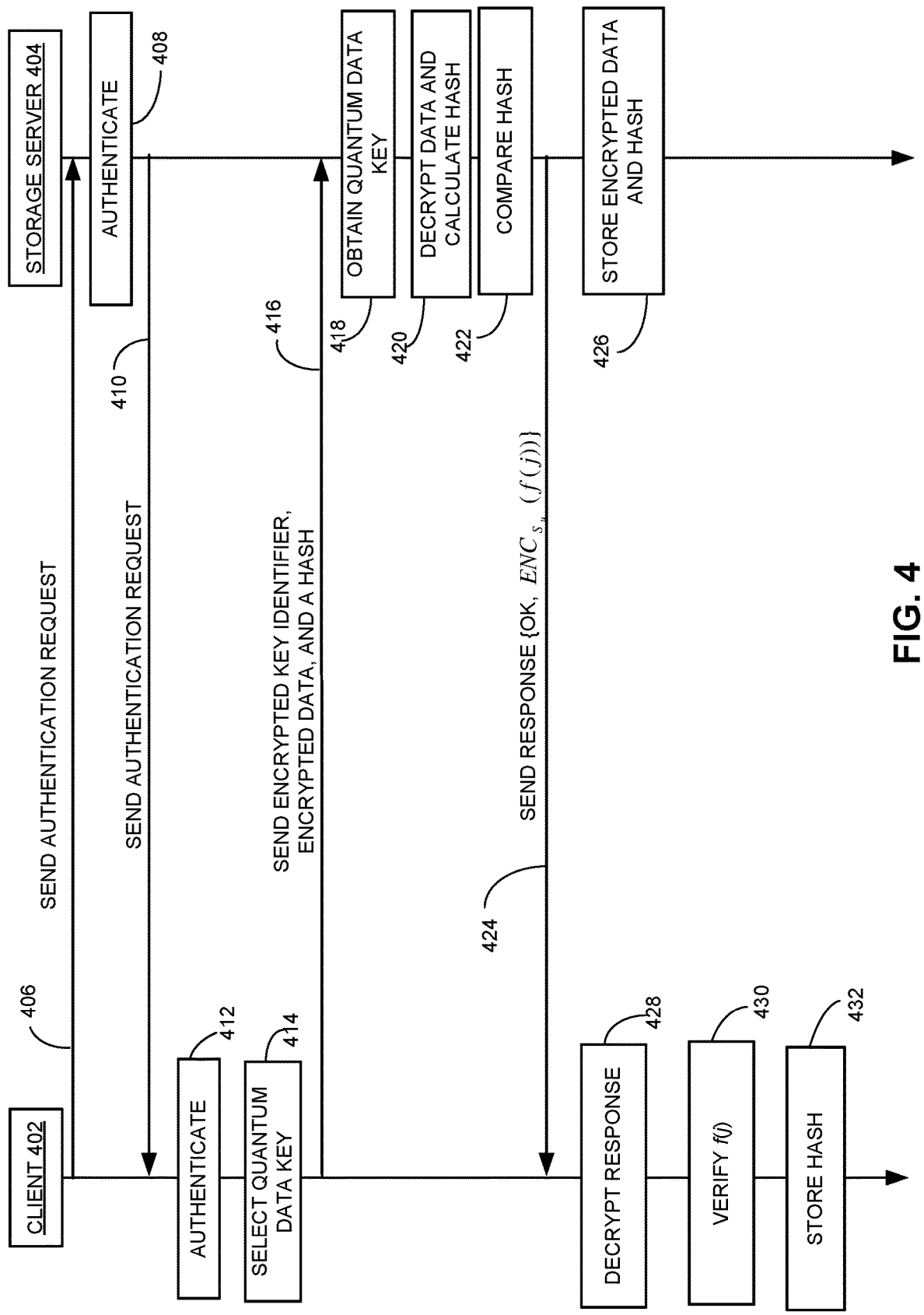
FIG. 4 presents a diagram describing the process of secure data storage, according to one embodiment.

FIG. 4 presents a diagram describing the process of secure data storage, according to one embodiment. During operation, a client 402 sends an authentication request to a storage server 404 (operation 406). The request can include a trusted certificate issued by the trusted authorization center and a trusted measurement report. The trusted measurement report includes the measurement result of the platform states of the trusted platform. More specifically, it can use various mechanisms, including certificate, completeness, and security assertion, to measure the trustworthiness of the trusted computing platform (e.g., the TPM) of client 402. Storage server 404 can be the one that provide storage service to client 402. Data from client 402 can be stored onto storage server 404 or a peripheral storage hosted by storage server 404.

Upon receiving the authentication request, storage server 404 authenticates client 402 based on both the trusted certificate and the trusted measurement report (operation 408). Note that, because the trusted certificate of client 402 is issued by the trusted authorization center, storage server 404 can assume its trustworthiness. Moreover, storage server 404 may also obtain identity and platform information included in the trusted certificate by decrypting, using the system public key, the trusted certificate, and then compare the identity and platform information against a whitelist to verify the trustworthiness of client 402.

In addition to identity verification, storage server 404 may also determine the platform integrity of client 402 based on the trusted measurement report included in the verification request. For example, the received trusted measurement report can be compared against the initial report of client 402 stored in the trusted authorization center. To do so, storage server 404 may send the trusted measurement report of client 402 to the trusted authorization center, which then compares the received report with the initial report and sends the result regarding the trustworthiness of client 402 to storage server 404. Alternatively, the trusted authorization center (or a master control node within a distributed system) can send the initial report of client 402 to storage server 404 to allow storage server 404 to compare the newly received report with the initial report in order to determine whether client 402 remains trusted. For example, if the received trusted measurement report shows that certain platform states deviate from the platform states in the initial report, it may indicate that the platform may have executed certain illegally modified codes and can no longer be trusted. As a result, storage server 404 can terminate the process by discarding or ignoring the authentication request from client 402. By examining the trusted measurement report of client 402, one can ensure dynamic verification of platform integrity, thus enabling a more accurate authentication outcome.

Upon authenticating client 402, storage server 404 can then send an authentication request to client 402 (operation 410). This authentication request can include the certificate issued by the trusted authorization center to storage server 404 and a trusted measurement report of storage server 404, which reflects the trustworthiness of storage server 404. Upon receiving the request, client 402 authenticates storage server 404 based on both the trusted certificate and the trusted measurement report (operation 412). Operation 412 can be similar to operation 408. If the authentication fails, client 402 can also terminate the process.

Subsequent to the mutual authentication, client 402 can select, based on a predetermined strategy, a quantum data key (e.g., Q_key_j) from the quantum data key pool (operation 414). For the one-time key scheme, the selected quantum data key is an unused key. In some embodiments, the quantum data key can be selected randomly. Alternatively, client 402 may use a predetermined algorithm to calculate j. For example, the quantum data key may have different lengths and, hence, may be suitable for encrypting data of different lengths. Client 402 can select a quantum data key of a particular length for encryption of data with a certain length. Because the quantum data key is stored in encrypted form, as shown in Table 2, client 402 needs to perform a decrypting operation. More specifically, client 402 can use its TPM (e.g., using the SRK or the SK) to decrypt the stored quantum data key.

Client 402 can then use the selected quantum data key to encrypt to-be-stored data (e.g., $ENC_{Q\_key\_j}(Data_j)$), and send the encrypted data along with the key-identifier to storage server 404. In some embodiments, to ensure the secrecy of the data, once client 402 encrypts the to-be-stored data using the selected quantum data key, client 402 may destroy the decrypted version of the selected quantum data key, thus preventing potential leakage of the quantum data key. Client 402 can then record the mapping relationship between the key-identifier and the to-be-stored data. For example, client 402 can map the key-identifier to an identifier (e.g., file name) of the to-be-stored data. In some embodiments, instead of sending the plaintext, client 402 can send an encrypted version of the key-identifier. The encryption key can be a shared secret between client 402 and storage server 404. For example, client 402 can share its own private key with storage server 404, and encrypt, using the private key, the key-identifier (e.g., $ENC_{S_u}(j)$). Alternatively, client 402 and storage server 404 can use other types of symmetric key as a shared secret. In addition, client 402 can calculate a hash of the to-be-stored data using the private key (e.g., $hash_{S_u}(Data_j)$. For example, a block cipher can be used to calculate the hash value. The hash value can later be used to verify the completeness of the data. Client 402 can then send a data storage request that includes the encrypted key-identifier, the encrypted data, and the hash to storage server 404 (operation 416). For the many-time key scheme, in addition to the key-identifier, client 402 also needs to send the identifier of the data to the storage server. Both the key-identifier and data-identifier can be used to index the data later stored in the storage server.

Upon receiving the message, storage server 404 can obtain j by decrypting $ENC_{S_u}(j)$ using $S_u$ (operation 418). Using j as an index, storage server 404 can perform a table lookup to obtain the quantum data key. Note that SRK and SK may be used to decrypt the encrypted quantum data key stored in the TPM storage server 404. Storage server 404 can then use the quantum data key to decrypt the received data and calculate a hash value of the data using the private key of client 402 (operation 420). Storage server 404 can then compare the calculated hash value with the received hash value in order to determine the authenticity and integrity of client 402 as well as the completeness of the received data (operation 422). A matching result can further validate client 402 and the completeness of the received data.

Accordingly, storage server 404 can send a response to client 402 (operation 424). The response can be used by client 402 to validate storage server 404. In some embodiments, the response can include an encrypted variation of the key identifier (i.e., $ENC_{S_u}(f(j))$, where $f(j)$ is a predetermined variation of j). For example, the response can include $ENC_{S_u}(j-1)$ or $ENC_{S_u}(j+1)$. Storage server 404 can then store the encrypted data as well as the hash value of the data into the same data structure that stores the quantum data keys and key-identifiers, indexed using the corresponding key-identifier (operation 426). Table 4 shows the secure storage data structure maintained by storage server 404.

TABLE 4

Secure Storage Data Structure Maintained by the Storage Server

| KEY-IDENTIFIER | ENCRYPTED QUANTUM DATA KEY | HASH VALUE OF DATA | ENCRYPTED DATA |
|---|---|---|---|
| 0 | $ENC_{sk\_s}$ (Q_key_0) | $hash_{S_u}$ (Data$_0$) | $ENC_{Q\_key\_0}$ (Data$_0$) |
| 1 | $ENC_{sk\_s}$ (Q_key_1) | $hash_{S_u}$ (Data$_1$) | $ENC_{Q\_key\_1}$ (Data$_1$) |
| 2 | $ENC_{sk\_s}$ (Q_key_2) | $hash_{S_u}$ (Data$_2$) | $ENC_{Q\_key\_2}$ (Data$_2$) |
| ... | ... | ... | ... |
| j | $ENC_{sk\_s}$ (Q_key_j) | $hash_{S_u}$ (Data$_j$) | $ENC_{Q\_key\_j}$ (Data$_j$) |
| ... | ... | ... | ... |
| m | $ENC_{sk\_s}$ (Q_key_m) | $hash_{S_u}$ (Data$_m$) | $ENC_{Q\_key\_m}$ (Data$_m$) |

Upon receiving the response, client 402 decrypts the response (operation 428) and verifies $f(j)$ (operation 430). If the received $f(j)$ matches the locally calculated $f(j)$, client 402 can validate storage server 404 and stores the hash value of the data into the same data structure that stores the quantum data keys and key-identifiers, indexed using the corresponding key-identifier (operation 432). Table 5 shows the secure storage data structure maintained by client 402.

TABLE 5

Secure Storage Data Structure Maintained by the Client

| KEY-IDENTIFIER | ENCRYPTED QUANTUM DATA KEY | HASH VALUE OF DATA |
|---|---|---|
| 0 | $ENC_{sk\_c}$ (Q_key_0) | $hash_{S_u}$ (Data$_0$) |
| 1 | $ENC_{sk\_c}$ (Q_key_1) | $hash_{S_u}$ (Data$_1$) |
| 2 | $ENC_{sk\_c}$ (Q_key_2) | $hash_{S_u}$ (Data$_2$) |
| ... | ... | ... |
| j | $ENC_{sk\_c}$ (Q_key_j) | $hash_{S_u}$ (Data$_j$) |
| ... | ... | ... |
| m | $ENC_{sk\_c}$ (Q_key_m) | $hash_{S_u}$ (Data$_m$) |

In the examples shown in FIG. 4 and Tables 4-5, each quantum data key is only used once for data encryption. In practice, it is also possible for a selected quantum data key to be used multiple times. For example, in operation 416, in addition to sending the key-identifier, client 402 may also send a data-batch-identifier, and a single key-identifier can correspond to multiple data-batch-identifiers. When storage server 404 stores the encrypted data, it stores both the key-identifier and the data-batch-identifier, which can be used for indexing the stored data batch or piece of data. Similarly, the data hash stored on client 402 can be indexed using both the key-identifier and the data-batch-identifier.

In some embodiments, the data may be stored in peripheral storage devices that do not have computation capabilities. In such scenarios, the peripheral storage device typically does not include trusted-computing modules and can only be used to store data and encryption keys. However, the host (e.g., a storage server) of such a peripheral storage device can be equipped with a trusted-computing module, which then provides the trusted-computing platform for the peripheral storage device. Moreover, encryption/decryption computation of the keys can be performed by the TPM of the host, and encryption/decryption computation of the data can be performed in the CPU space designated by the host to the cloud user.

In some embodiments, the data may be stored in peripheral storage devices with computation capabilities. In such scenarios, the peripheral storage device can include a TPM, which can perform the encryption/decryption computations. The encryption/decryption operation of the data can be similar to the one performed on a storage server.

Because both the cloud storage client and the cloud storage equipment provided by the cloud storage provider are equipped with trusted-computing modules (e.g., TPM or TPCM), the quantum data keys can be protected by the SRK or SK provided by the trusted-computing modules, thus achieving tamper-free key storage, which leads to secure data storage over the cloud. Moreover, the stored data can be indexed using the key-identifier of the quantum data key, thus facilitating subsequent data retrieval.

Figure 5:
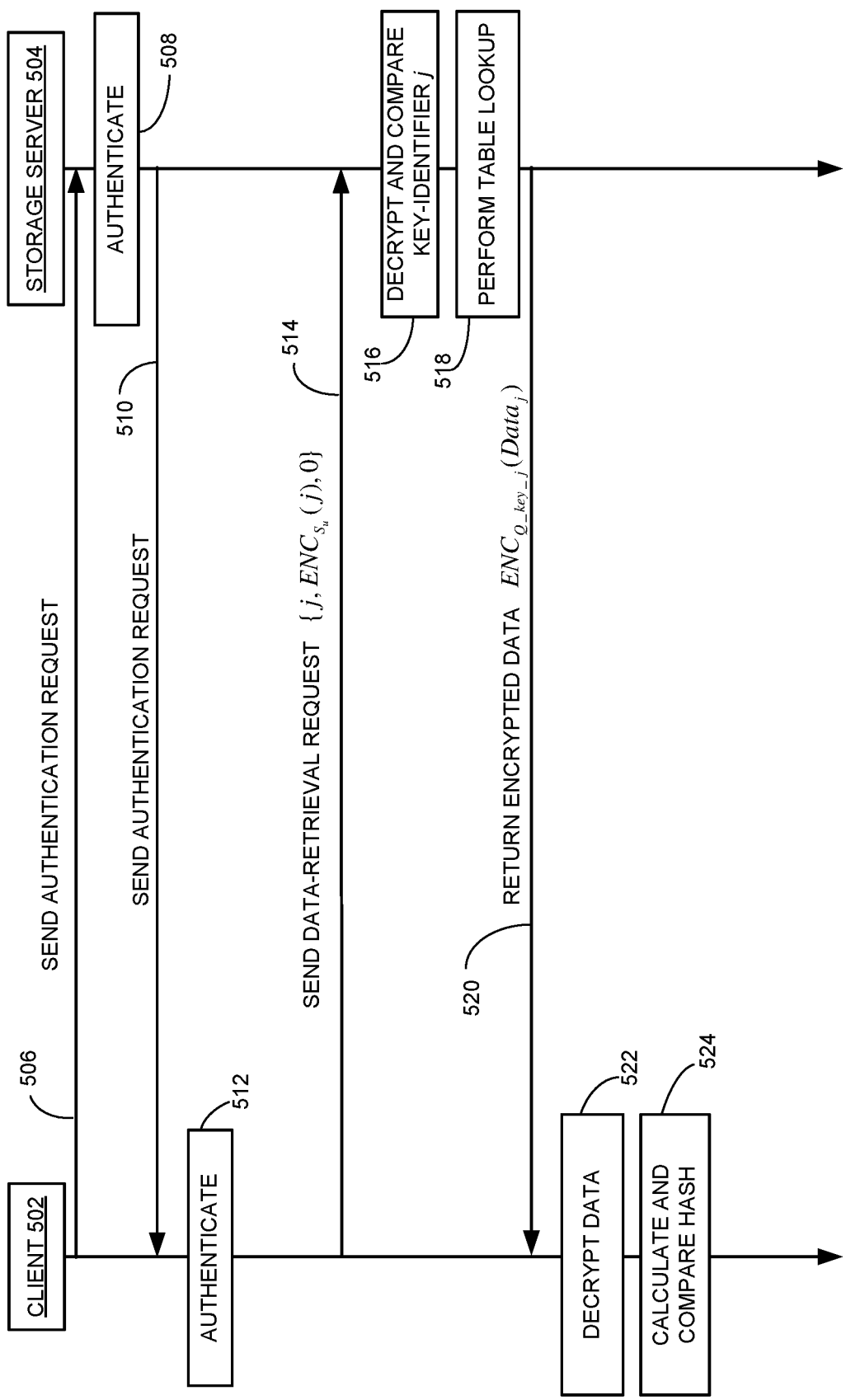
FIG. 5 presents a diagram describing the process of secure data retrieval, according to one embodiment.

FIG. 5 presents a diagram describing the process of secure data retrieval, according to one embodiment. During operation, client 502 sends an authentication request to storage server 504 (operation 506). The authentication request can include a trusted certificate issued by the trusted authorization center and a trusted measurement report. Upon receiving the authentication request, storage server 504 authenticates client 502 based on both the trusted certificate and the trusted measurement report (operation 508). Similar to operation 408 shown in FIG. 4, authenticating client 502 can include verifying the platform integrity of client 502 based on the trusted measurement report.

Subsequent to authenticating client 502, storage server 504 can send an authentication request to client 502 (operation 510), and client 502 can authenticate server 504 based on the authentication request (operation 512). Note that the mutual authentication performed here by client 502 and storage server 504 can be similar to the mutual authentication process shown in FIG. 4.

After successful mutual authentication, client 502 can send a data-retrieval request to storage server 504 (operation 514). The data-retrieval request can include a key-identifier that corresponds to the quantum data key used for encrypting the to-be-retrieved data. In some embodiments, in addition to the plaintext, the data-retrieval request may also include the encrypted (e.g., using the private key $S_u$ of client 502) key-identifier and a computation indicator. The computation indicator can indicate whether storage server 504 needs to perform computation on the retrieved data. In the example shown in FIG. 5, the data-retrieval request includes {j, $ENC_{S_u}(j)$, 0}, where the computation indicator is set as "0," meaning that client 502 only needs to retrieve the originally stored data and no computation on the data is needed.

Upon receiving the data-retrieval request, storage server 504 can decrypt $ENC_{S_u}(j)$ using $S_u$, which is a shared secret between client 502 and storage server 504, and compare the decrypted key-identifier with the received plaintext key-identifier (operation 516). A matching result can validate client 502. Subsequently, storage server 504 can perform a table lookup based on the key-identifier to obtain the encrypted data (operation 518) and return the encrypted data (operation 520).

Upon receiving the encrypted data, client 502 decrypts the received data using the corresponding quantum data key (operation 522). Note that, before data decryption, client 502 may first need to decrypt, using the SRK or SK, a corresponding entry stored in Table 5 to obtain the quantum data key. Client 502 can then use the obtained quantum data key to decrypt the received data. Client 502 can calculate a hash value of the decrypted data based on its private key $S_u$, and compare the calculated hash value with the hash value stored in Table 5 (operation 524). A matching result can authenticate storage server 504 and indicate the completeness of the received data. Otherwise, storage server 504 cannot be trusted and the data may have been tampered with, and client 502 can then choose to discard the received data.

Figure 6:
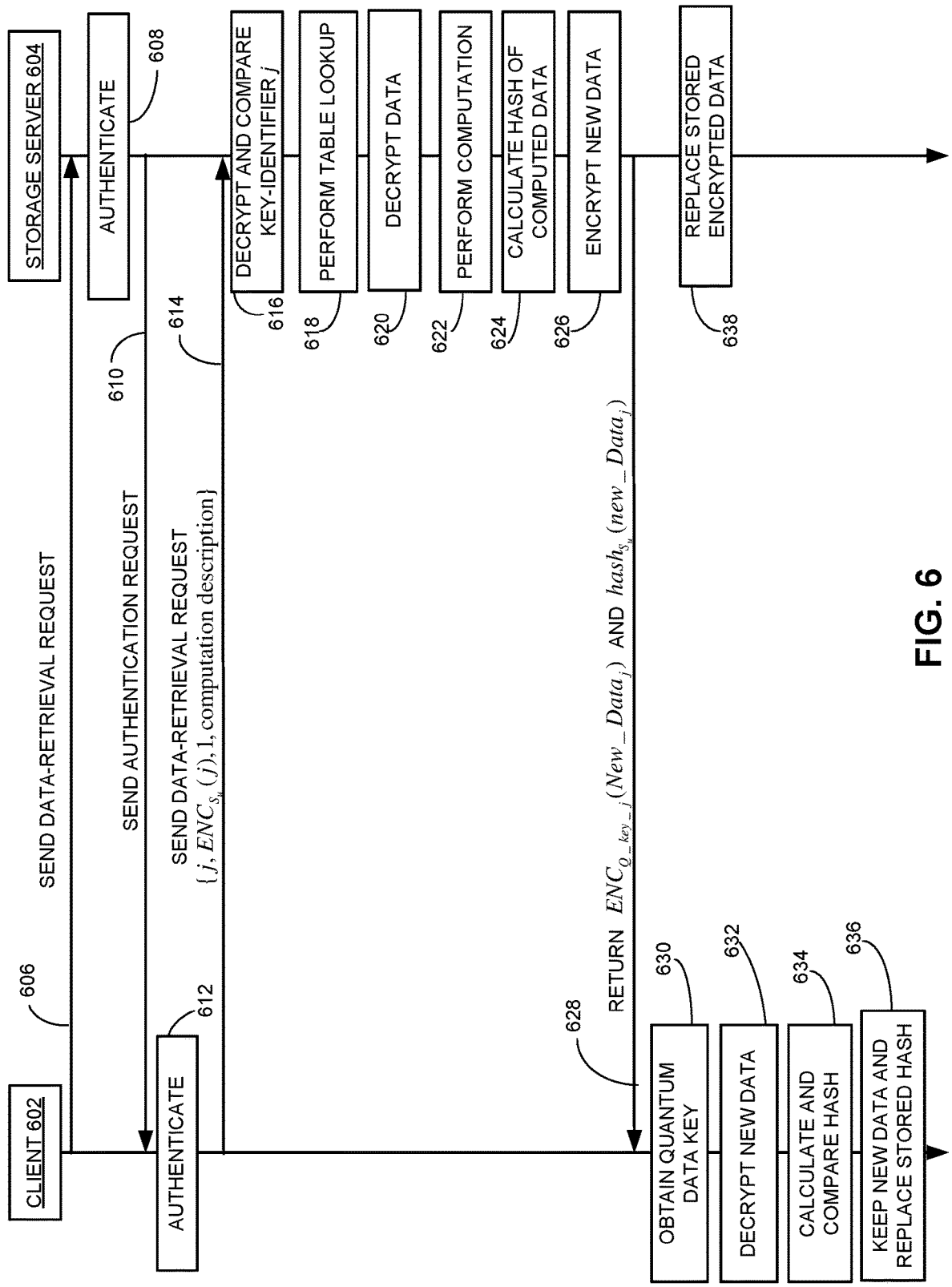
FIG. 6 presents a diagram describing the process of secure data retrieval, according to one embodiment.

FIG. 6 presents a diagram describing the process of secure data retrieval, according to one embodiment. In this example, in addition to retrieving data from a storage server, a client may also instruct the storage server to perform certain computation operations on the data. Offloading the data computations to the storage server can lessen the computation burden on the client device, because the computational capability of the storage server is typically more powerful than that of the client device.

During operation, client 602 sends an authentication request to storage server 604 (operation 606), and storage server 604 authenticates client 602 based on both a trusted certificate and a trusted measurement report included in the authentication request (operation 608). Subsequently, storage server 604 sends an authentication request to client 602 (operation 610), and client 602 authenticates server 604 (operation 612). The mutual authentication process shown in FIG. 6 is similar to the ones shown in FIGS. 4 and 5.

After successful mutual authentication, client 602 can send a data-retrieval request to storage server 604, with the computation indicator in the data-retrieval request set as "1" (operation 614). By setting the computation indicator to a value of "1," client 602 indicates to storage server 604 that a computation is needed. In addition, client 602 can also include the computation description field in the data-retrieval request to notify storage server 604 what type of computation is needed. For example, client 602 may request storage server 604 to sort or compute the sum of the retrieved data.

The data-retrieval request can further include a key-identifier. In some embodiments, in addition to the plaintext key identifier, an encrypted version (e.g., encrypted using the private key $S_u$ of client 602) of the key-identifier can also be included in the data-retrieval request. In the example shown in FIG. 6, the data-retrieval request can take the form of:

{j, $ENC_{S_u}$(j), 1, computation description}.

Upon receiving the data-retrieval request, storage server 604 can decrypt $ENC_{S_u}$(j) using $S_u$ and compare the decrypted key-identifier with the received plaintext key-identifier (operation 616). A matching result can validate client 602. Subsequently, storage server 604 can perform a table lookup based on the key-identifier to obtain the encrypted data and the quantum data key (operation 618), and use the quantum data key to decrypt the obtained the data (operation 620). Storage server 604 can further perform the requested computation on the obtained data based on the computation description included in the data-retrieval request (operation 622). The computation result can be denoted New_Data.

Storage server 604 can then calculate the hash of the computation result based on the private key of client 602 (operation 624), encrypt the computation result using the quantum data key (operation 626), and return the hash of the computation result and the encrypted computation result back to client 602 (operation 628). More specifically, storage server 604 can return {$ENC_{Q\_key\_j}$ (New_Data$_j$), hash$_{S_u}$ (New_Data$_j$)}.

Upon receiving the hash of the computation result and the encrypted computation result from storage server 604, client 602 can obtain the quantum data key based on the key-identifier included in the data-retrieval request (operation 630), and then decrypt, using the quantum data key, the computation result (operation 632). Client 602 can further calculate the hash of the computation result and compare the calculated hash with the received hash (operation 634) in order to validate storage server 604 and determine the completeness of the data. If the hashes match, client 602 can keep the retrieved data and replace the stored hash value of the original data with the hash value of the new data (operation 636); otherwise, client 602 will discard the retrieved data as being invalid. More specifically, client 602 can replace hash$_{S_u}$(Data$_j$) stored in the data structure shown in FIG. 5 with hash$_{S_u}$(New_Data$_j$). Storage server 604 can also replace the stored encrypted data with the encrypted new data (i.e., replace $ENC_{Q\_key\_j}$ (Data$_j$) in the data structure shown in FIG. 4 with $ENC_{Q\_key\_j}$ (New_Data$_j$)) (operation 638).

Figure 7:
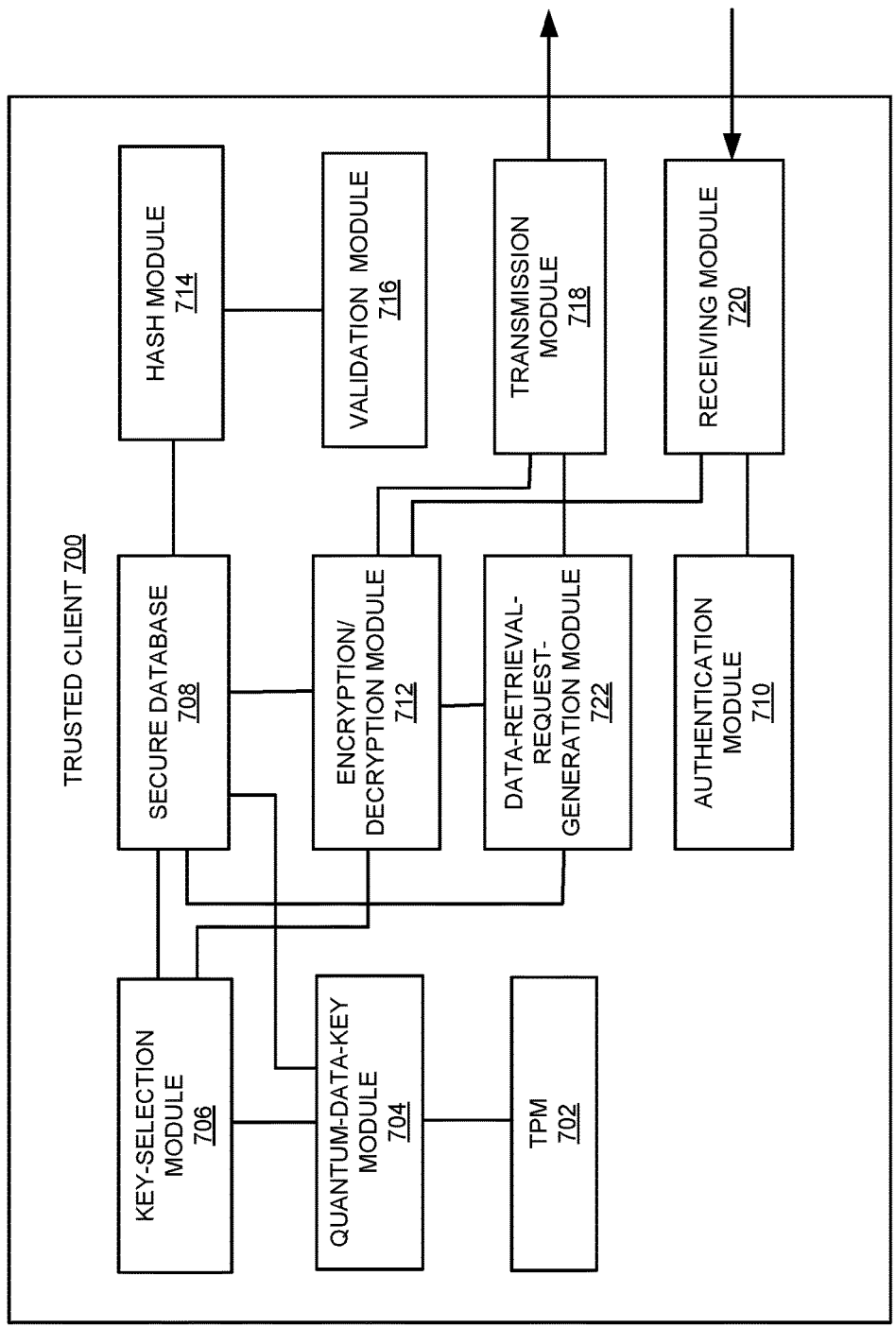
FIG. 7 illustrates a block diagram of a trusted client for secure data storage and retrieval, according to one embodiment.

FIG. 7 illustrates a block diagram of a trusted client for secure data storage and retrieval, according to one embodiment. Trusted client 700 can include a TPM 702, a quantum-data-key module 704, a key-selection module 706, a secure database 708, an authentication module 710, an encryption/decryption module 712, a hash module 714, a validation module 716, a transmission module 718, a receiving module 720, and a data-retrieval-request-generation module 722.

TPM 702 can provide various trusted computing functionalities, including storing and generating keys and/or certificates, and monitoring the platform status. Quantum-data-key module 704 can be responsible for negotiating quantum data keys with other entities in the cloud computing system. The negotiated quantum data keys can be stored in secure database 708, encrypted using SRK or SK and indexed using key-identifiers. In some embodiments, the encryption of the quantum data keys can involve TPM 702.

Key-selection module 706 can be responsible for selecting, from secure database 708, quantum data keys for encrypting to-be-transmitted data. Key-selection module 706 can use various criteria, such as the length of the to-be-transmitted data, to select a quantum data key. For the one-time key scheme, each quantum data key can only be selected once. In addition to quantum data keys, secure database 708 can also be responsible for storing the hash values of data that has been transmitted to and stored on a cloud storage device, such as a storage server or a peripheral storage device. The data can be the original data or new data retrieved from the cloud storage device. The new data may be computed by the storage server based on the request from trusted client 700.

Authentication module 710 can be responsible for authenticating a communication partner, such as a storage server or other cloud computing component. Encryption/decryption module 712 can be responsible for performing encrypting/decrypting operations. More specifically, encryption/decryption module 712 can be responsible for encrypting/decrypting key-identifiers and data exchanged between trusted client 700 and cloud storage devices.

Hash module 714 can be responsible for calculating hash values. In some embodiments, hash module 714 can be calculated based on to-be-hashed key-identifier or data, as well as the private key of trusted client 700. For example, a Keyed-Hash Message Authentication Code (HMAC) can be generated. Validation module 716 can be used to validate the integrity of the data as well as the authentication of the message based on the hash value.

Transmission module 718 and receiving module 720 can be responsible for transmitting messages to and receiving messages from a communication partner, respectively. The communication partner can be a trusted cloud storage device, such as a storage server or a peripheral storage device. To facilitate QKD, transmission module 718 or receiving module 720 can also be coupled to a quantum channel. If no quantum channel is available, receiving module 720 can be coupled to a quantum key injection module, which is coupled, via various types of interface (e.g., a network interface, a universal serial bus (USB) interface, or a console interface), to quantum key distribution equipment. The quantum key injection module can then inject shared quantum strings to quantum data key module 704, which can then negotiate quantum data keys based on the shared quantum string. Data-retrieval-request-generation module 722 can be responsible for generating a data-retrieval request, which can be sent to the cloud storage server by transmission module 718.

During the operation of secure data storage, authentication module 710 can participate in the mutual authentication between trusted client 700 and a storage server. Subsequent to the mutual authentication, key-selection module 706 can select a quantum data key, and TPM 702 can decrypt, using the SRK or SK, the encrypted quantum data key stored in secure database 708. Encryption/decryption module 712 can then use the obtained quantum data key to encrypt the to-be-transmitted data and use the private key of trusted client 700 to encrypt the key-identifier. Hash module 714 can calculate a hash based on both the to-be-transmitted data and the private key of trusted client 700. Transmission module 718 can transmit the encrypted key-identifier, the encrypted data, and the data hash to the cloud storage device. Subsequent to validation module 716 validating a response from the cloud storage module, trusted client 700 can store the data hash into secure database 708.

During the operation of secure data retrieval, data-retrieval-request-generation module 722 can generate a data-retrieval request. The data-generation request can include at least a key-identifier corresponding to the to-be-retrieved data. The data-retrieval request can further indicate whether a computation on the data is needed; and if so, the data-retrieval request can include a description of the requested computation. Receiving module 720 can receive the data-retrieval response from the cloud storage device. The data-retrieval response can include the encrypted data or the encrypted computation result of the data. Encryption/decryption module 712 can first decrypt the encrypted quantum data key stored in secure database 708, and then decrypt, using the quantum data key, the received data or computation result. Validation module 716 can validate the received data or computation result based on the output of hash module 714.

Figure 8:
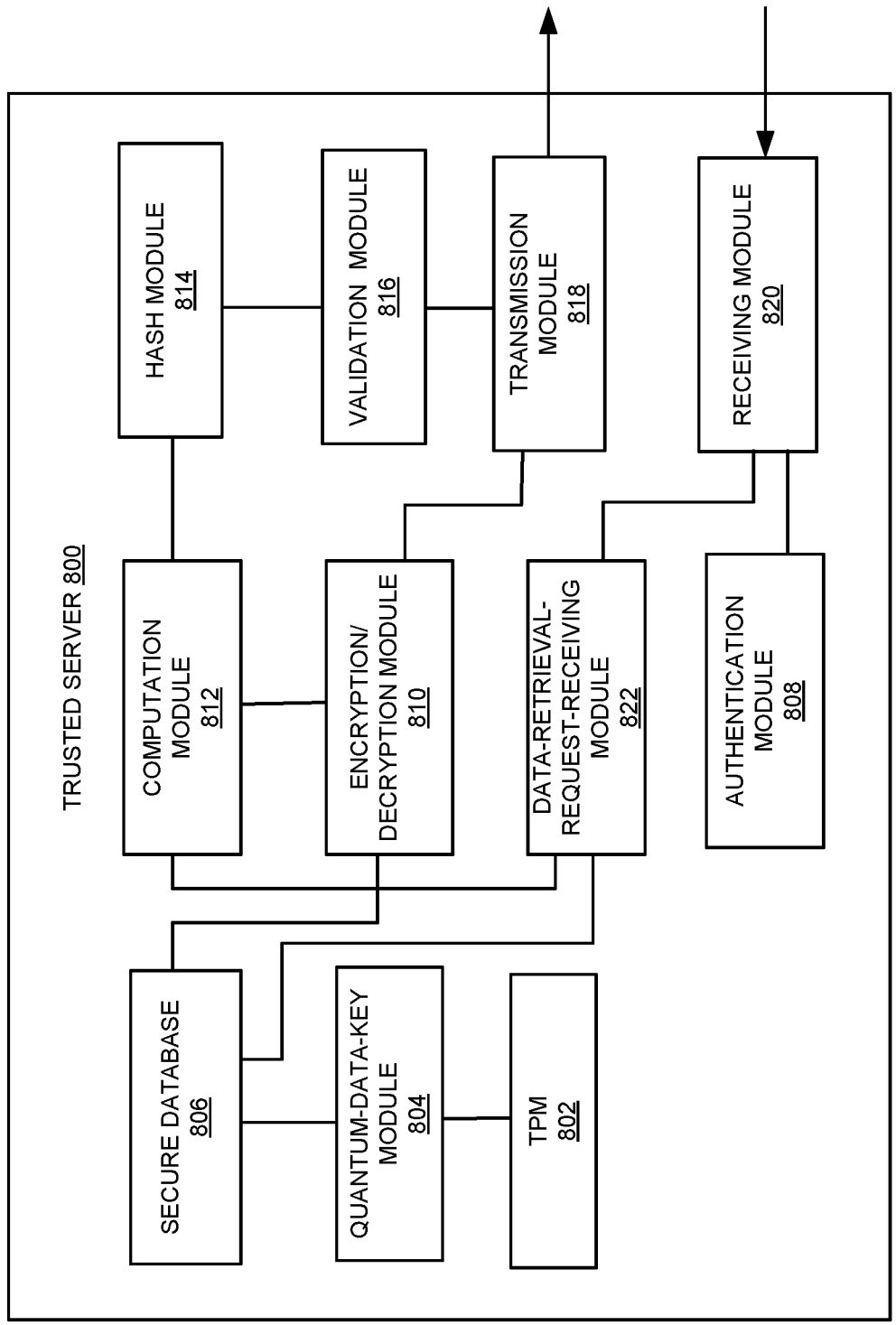
FIG. 8 illustrates a block diagram of a trusted storage server for secure data storage and retrieval, according to one embodiment.

FIG. 8 illustrates a block diagram of a trusted server for secure data storage and retrieval, according to one embodiment. Trusted server 800 can include a TPM 802, a quantum-data-key module 804, a secure database 806, an authentication module 808, an encryption/decryption module 810, a computation module 812, a hash module 814, a validation module 816, a transmission module 818, a receiving module 820, and a data-retrieval-request-processing module 822.

TPM 802 and quantum-data-key module 804 can be similar to TPM 702 and quantum-data-key module 704 shown in FIG. 7. Secure database 806 can store encrypted quantum data keys and encrypted data from a client, both indexed using key-identifiers. Authentication module 808 and encryption/decryption module 810 can be similar to authentication module 710 and encryption/decryption module 712, respectively, shown in FIG. 7.

Computation module 812 can be responsible for performing computation on client data based on computation descriptions included in the data-retrieval request. Hash module 814 can be responsible for calculating a hash of the stored data or computation result, and validation module 816 can be responsible for validating to-be-stored data based on a calculated hash of the to-be-stored data. Transmission module 818 and a receiving module 820 can be similar to transmission module 718 and a receiving module 720, respectively, shown in FIG. 7. Data-retrieval-request-processing module 822 can be responsible for receiving and processing the data-retrieval request. More specifically, data-retrieval-request-processing module 822 can extract and verify the key-identifier included in the data-retrieval request. Data-retrieval-request-processing module 822 can also determine whether computations on the data are needed.

During the operation of secure data storage, authentication module 808 can participate in the mutual authentication between trusted server 800 and a trusted client. Upon receiving the encrypted data and the hash of the data from the trusted client, encryption/decryption module 810 can decrypt the received data, and hash module 814 can calculate the hash of the decrypted data. Validation module 816 can validate the received data by comparing the calculated hash with the received hash. Subsequent to validating the received data, transmission module 818 can transmit a response to the trusted client and the encrypted data can be stored in secure database 806.

During the operation of secure data retrieval, data-retrieval-request-receiving module 822 can process a data-retrieval request received by receiving module 820 from the client device. Data-retrieval-request-processing module 822 can extract a key-identifier from the data-retrieval request and determines whether a computation on the data is needed. Based on the key-identifier, data-retrieval-request-processing module 822 can obtain the encrypted data from secure database 806. If no computation is needed, transmission module 818 can transmit the encrypted data back to the client device. If computation is needed, encryption/decryption module 810 can decrypt the encrypted data, and computation module 812 can perform computation on the decrypted data based on the computation description included in the data-retrieval request. Encryption/decryption module 810 further encrypts the computation result, and hash module 814 calculates a hash of the computation result. Accordingly, transmission module 818 can transmit the encrypted computation result and the hash of the computation result to the client device. The hash of the computation result can also be stored in secure database 806 in place of the hash of the original data.

Once the customer data has been stored in the cloud, a separate entity that has been authorized by the data owner may also wish to access the customer data. To facilitate data retrieval by an authorized third party, in some embodiments, the client or the storage server may send the quantum data keys shared by the client and storage server to the authorized third party. The authorized third party can store the quantum data keys in its secure database, indexed by key-identifiers that have corresponding relationships to the key-identifiers used on the client or storage server. For example, the authorized third party may store the quantum data keys in its TPM or protect the quantum data keys using its SRK or a SK.

Moreover, to facilitate the authorized third party to retrieve data from the storage server, the data owner may also send, via a secure communication channel, the mapping relationship between the quantum data key and the stored data to the authorized third party. The authorized third party can then construct a secure storage data structure that is similar to the one shown in FIG. 5. For authentication purposes, the authorized third party may also share its system private key with the storage server. The authorized third party can then retrieve data from the storage server using a process that is similar to the one shown in FIG. 5 or 6.

In general, embodiments disclosed herein provide a solution to the technical problem of secure data storage and retrieval. More specifically, the client device and the storage server can share previously negotiated quantum data keys and can be equipped with hardware, firmware, or software devices that can enforce rules for trusted computing. The combination of trusted computing and quantum data keys strengthens security in data storage and retrieval. More specifically, data stored in the cloud is encrypted using quantum data keys, which themselves are protected by trusted-computing modules. Moreover, during operation, the platform integrity is dynamically verified using a trusted measurement report, thus further enhancing security of the operations of data storage and retrieval.

Figure 9:
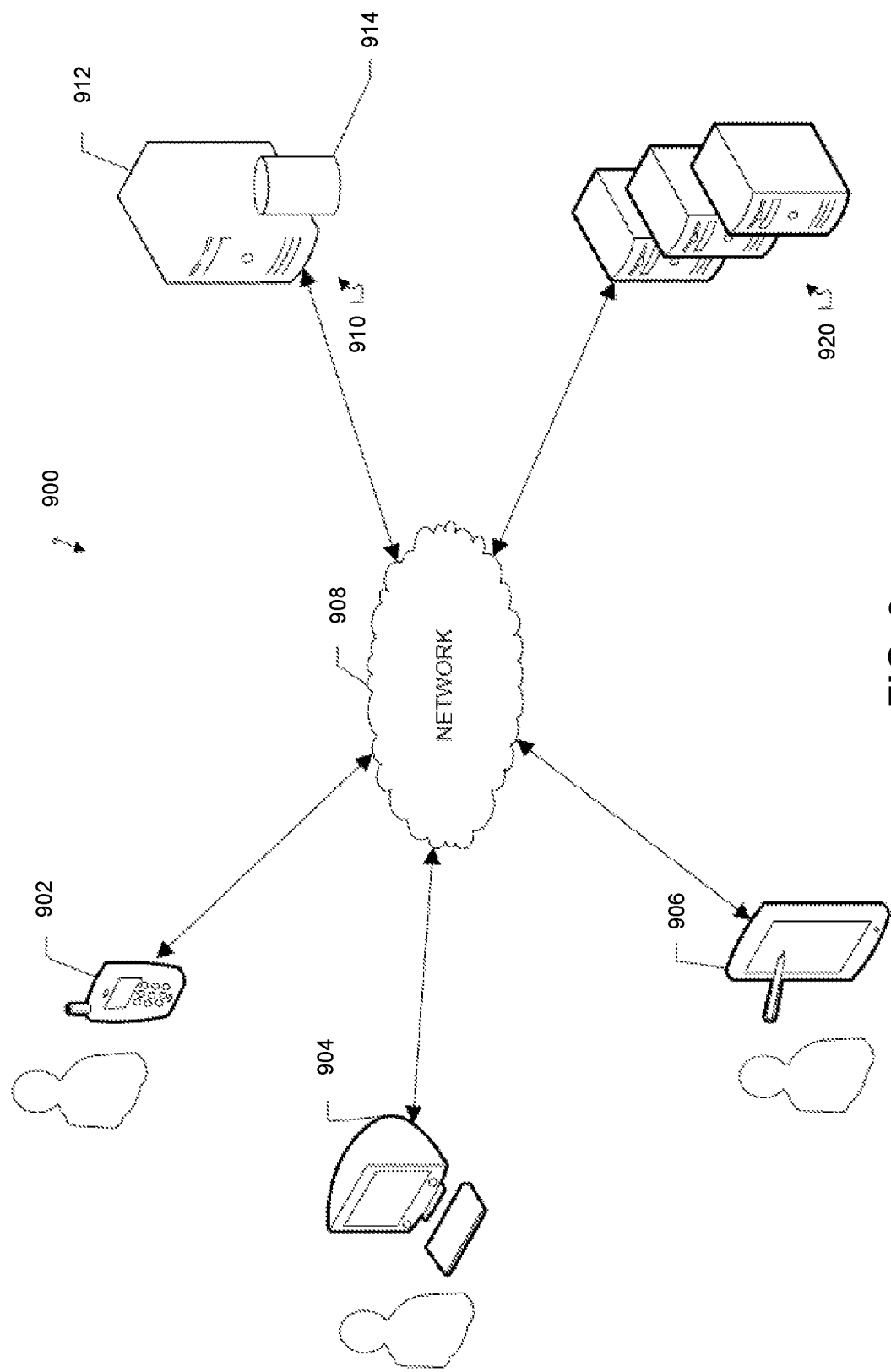
FIG. 9 illustrates an exemplary client-server network environment for implementing the disclosed eavesdropping-detection technology, in accordance with some embodiments described herein.

FIG. 9 illustrates an exemplary client-server network environment for implementing the disclosed eavesdropping-detection technology, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a smartphone, electronic device 904 is depicted as a desktop computer, and electronic device 906 is depicted as a PDA.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910 either alone or in combination with server 910. Each of the one or more remote servers 920 may host various services. For example, servers 920 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 910 may further maintain or be in communication with social networking services hosted on one or more remote servers 920. The one or more social networking services may provide various services and may enable users to create a profile and associate themselves with other users at a remote social networking service. The server 910 and/or the one or more remote servers 920 may further facilitate the generation and maintenance of a social graph including the user-created associations. The social graphs may include, for example, a list of all users of the remote social networking service and their associations with other users of a remote social networking service.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system and the one or more social networking services through a web-based browser application at the electronic devices 902, 904, 906. Communication among client devices 902, 904, 906 and the system, and/or one or more services, may be facilitated through a network (e.g., network 908).

Communications among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies, including a bus network, a star network, a ring network, a mesh network, a star-bus network, a tree or hierarchical network, and the like.

Figure 10:
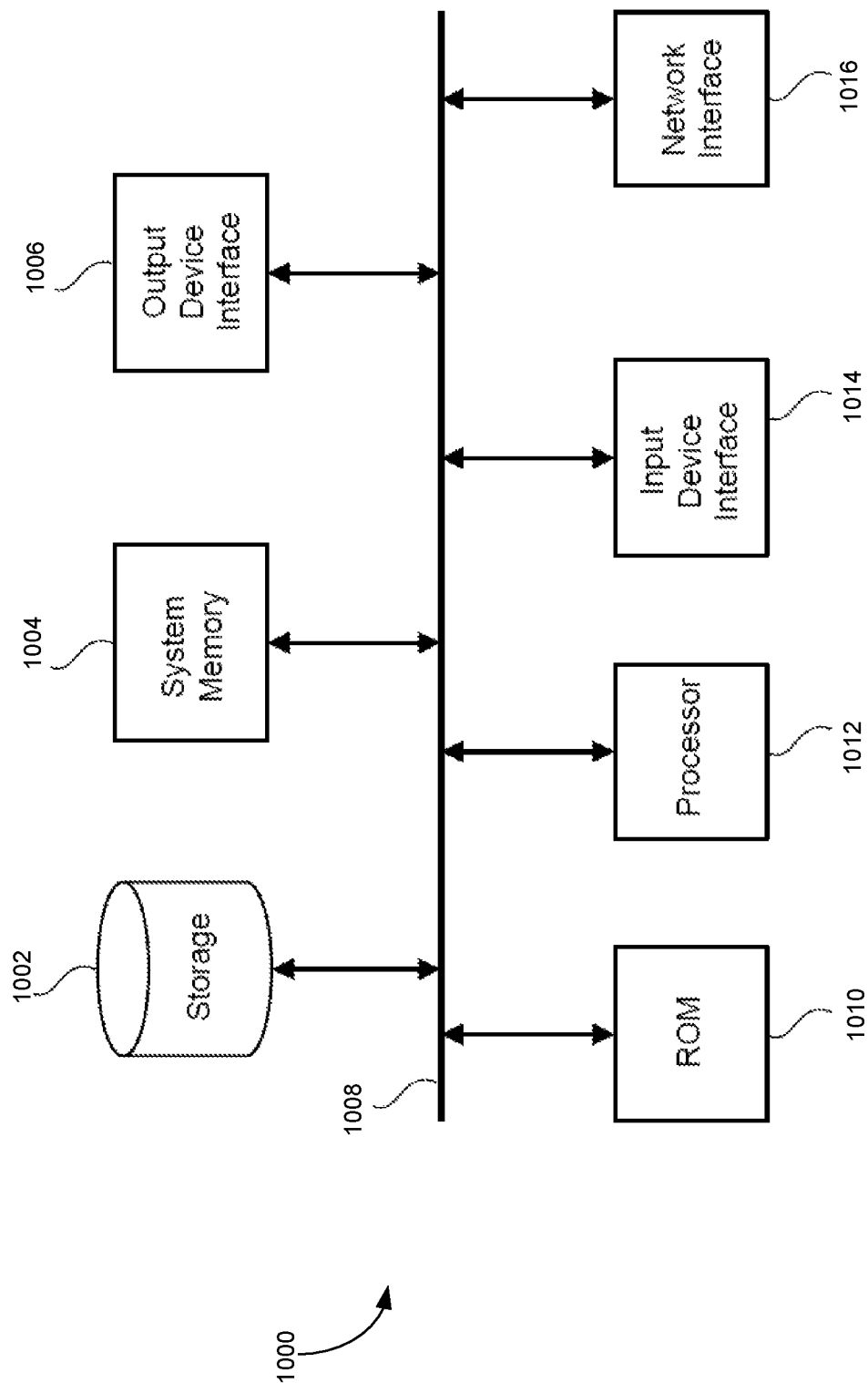
FIG. 10 conceptually illustrates an electronic system with which some embodiments of the subject technology are implemented.

FIG. 10 conceptually illustrates an electronic system with which some implementations of the subject technology are implemented. Electronic system 1000 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of electronic system 1000. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interface 1006 enables, for example, the display of images generated by electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for secure data storage, the method comprising:
   selecting, by a client device, a quantum data key from a plurality of quantum data keys shared between the client device and a storage server;
   encrypting, using the selected quantum data key, to-be-stored data;
   transmitting, by the client device, a data-storage request to the storage server, wherein the data-storage request comprises a key-identifier of the selected quantum data key and the encrypted data; and
   receiving, from the storage server, a data-storage response, wherein the data-storage response includes a predetermined variation of the key-identifier, and wherein the predetermined variation of the key-identifier is calculated based on a function shared between the client device and the storage server.

2. The computer-implemented method of claim 1, further comprising performing mutual authentication between the client device and the storage server, wherein the mutual authentication comprises exchanging trusted measurement reports between the client device and the storage server.

3. The computer-implemented method of claim 1, wherein the data-storage request further comprises a hash of the to-be-stored data, thereby facilitating the storage server to validate the encrypted data included in the data-storage request.

4. The computer-implemented method of claim 3, further comprising:
   in response to validating the predetermined variation of the key-identifier, saving, by the client device, the hash of the to-be-stored data, wherein the saved hash of the to-be-stored data is indexed using the key-identifier.

5. The computer-implemented method of claim 1, wherein the key-identifier included in the data-storage request is encrypted.

6. The computer-implemented method of claim 1, wherein the quantum data keys are encrypted using a storage root key provided by a trusted computing module or a storage key derived from the storage root key, and wherein selecting the quantum data key further comprises performing a decryption operation.

7. The computer-implemented method of claim 1, further comprising:
transmitting, by the client device, a data-retrieval request to the storage server, wherein the data retrieval request comprises a second key-identifier; and
receiving, from the storage server, a second piece of data encrypted using a second quantum data key corresponding to the second key-identifier.

8. The computer-implemented method of claim 7, further comprising:
decrypting the received second piece of data;
computing a hash of the second piece of data; and
determining validity of the received second piece of data based on the computed hash of the second piece of data and a hash stored on the client device.

9. The computer-implemented method of claim 7, wherein the data-retrieval request further comprises a computation indicator configured to indicate to the storage server whether computation on the second piece of data is needed.

10. A secure data storage client device, the client device comprising:
a processor; and
a storage device coupled to the processor and storing instructions which when executed by the processor cause the processor to perform a method for secure data storage, wherein the method comprises:
selecting a quantum data key from a plurality of quantum data keys shared between the client device and a storage server;
encrypting, using the selected quantum data key, to-be-stored data;
transmitting a data-storage request to the storage server, wherein the data-storage request comprises a key-identifier of the selected quantum data key and the encrypted data; and
receiving, from the storage server, a data-storage response, wherein the data-storage response includes a predetermined variation of the key-identifier, and wherein the predetermined variation of the key-identifier is calculated based on a function shared between the client device and the storage server.

11. The secure data storage client device of claim 10, wherein the data-storage request further comprises a hash of the to-be-stored data, thereby facilitating the storage server to validate the encrypted data included in the data-storage request.

12. The secure data storage client device of claim 11, wherein the method further comprises:
in response to validating the predetermined variation of the key-identifier, saving the hash of the to-be-stored data, wherein the saved hash of the to-be-stored data is indexed using the key identifier.

13. The secure data storage client device of claim 10, further comprising a trusted-computing module configured to provide a storage root key, wherein the quantum data keys are encrypted using the storage root key or a storage key derived from the storage root key.

14. The secure data storage client device of claim 10, wherein the method further comprises:
transmitting a data-retrieval request to the storage server, wherein the data retrieval request comprises a second key-identifier; and
receiving, from the storage server, a second piece of data encrypted using a second quantum data key corresponding to the second key-identifier.

15. A computer-implemented method for secure data storage, the method comprising:
receiving, by a storage server, a data-storage request from a client, wherein the data-storage request comprises a key-identifier and encrypted data, and wherein the key-identifier is configured to identify a quantum data key from a plurality of quantum data keys shared between the client and the storage server, and wherein the encrypted data is encrypted using the identified quantum data key;
transmitting a data-storage response to the client, wherein the data-storage response includes a predetermined variation of the key-identifier, and wherein the predetermined variation of the key-identifier is calculated based on a function shared between the client and the storage server; and
storing the encrypted data and indexing the stored data using the key-identifier.

16. The computer-implemented method of claim 15, further comprising performing mutual authentication between the storage server and the client, wherein the mutual authentication comprises exchanging trusted measurement reports between the storage server and the client.

17. The computer-implemented method of claim 15, wherein the data-storage request further comprises a hash of the data, and wherein the method further comprises:
obtaining the quantum data key based on the received key-identifier;
performing a decryption operation on the encrypted data using the quantum data key; and
calculating a hash based on the decrypted data; and
wherein the data-storage response is transmitted to the client in response to the calculated hash matching the hash included in the data-storage request.

18. The computer-implemented method of claim 17, wherein the quantum data keys are encrypted using a storage root key provided by a trusted computing module or a storage key derived from the storage root key, and obtaining the quantum data key further comprises performing a decryption operation.

19. The computer-implemented method of claim 15, further comprising:
receiving, by the storage server, a data-retrieval request from the client, wherein the data retrieval request comprises a second key-identifier;
performing a table lookup to obtain a second piece of data encrypted using a second quantum data key corresponding to the second key-identifier; and
transmitting a data-retrieval response to the client, wherein the data-retrieval response comprises the encrypted second piece of data.

20. The computer-implemented method of claim 19, wherein the data-retrieval request further comprises a computation indicator configured to indicate whether computation on the second piece of data is needed, and wherein the method further comprises:

in response to the computation indicator indicating that computation on the second piece of data is needed, performing computation based on a computation description included in the data-retrieval request to obtain computation result;

encrypting the computation result using the second quantum data key; and replacing the encrypted second piece of data included in the data-retrieval response with the encrypted computation result.

21. The computer-implemented method of claim 20, further comprising:

calculating a hash of the computation result; and including the hash in the data-retrieval response, thereby facilitating the client to validate the data-retrieval response.

22. A secure data storage server, the server comprising:

a processor; and a storage device coupled to the processor and storing instructions which when executed by the processor cause the processor to perform a method for secure data storage, wherein the method comprises:

receiving a data-storage request from a client, wherein the data-storage request comprises a key-identifier and encrypted data, and wherein the key-identifier is configured to identify a quantum data key from a plurality of quantum data keys shared between the client and the storage server, and wherein the encrypted data is encrypted using the identified quantum data key;

transmitting a data-storage response to the client, wherein the data-storage response includes a predetermined variation of the key-identifier, and wherein the predetermined variation of the key-identifier is calculated based on a function shared between the client and the storage server; and storing the encrypted data and indexing the stored data using the key-identifier.

23. The secure data storage server of claim 22, wherein the data-storage request further comprises a hash of the data, and wherein the method further comprises:

obtaining the quantum data key based on the received key-identifier;

performing a decryption operation on the encrypted data using the quantum data key; and calculating a hash based on the decrypted data; and wherein the data-storage response is transmitted in response to the calculated hash matching the hash included in the data-storage request.

24. The secure data storage server of claim 22, wherein the method further comprises:

receiving a data-retrieval request from the client, wherein the data retrieval request comprises a second key-identifier;

performing a table lookup to obtain a second piece of data encrypted using a second quantum data key corresponding to the second key-identifier; and transmitting a data-retrieval response to the client, wherein the data-retrieval response comprises the encrypted second piece of data.

* * * * *